(12) United States Patent
Westermann et al.

(10) Patent No.: US 6,209,166 B1
(45) Date of Patent: Apr. 3, 2001

(54) WINDSHIELD WIPER

(75) Inventors: Klaus-Juergen Westermann, Karlsbad (DE); Eric Pollaris, Meeuwen-Gruitrook (BE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/319,803

(22) PCT Filed: Oct. 8, 1998

(86) PCT No.: PCT/DE98/02970

§ 371 Date: Aug. 9, 1999

§ 102(e) Date: Aug. 9, 1999

(87) PCT Pub. No.: WO99/20503

PCT Pub. Date: Apr. 29, 1999

(30) Foreign Application Priority Data

Oct. 16, 1997 (DE) .......................................... 297 18 379 U

(51) Int. Cl.[7] ................. B60S 1/40; B60S 1/42
(52) U.S. Cl. ................................................ 15/250.32
(58) Field of Search .................. 15/250.32, 250.31, 15/250.351, 250.361, 250.33, 250.43, 250.44

(56) References Cited

U.S. PATENT DOCUMENTS

| | | | |
|---|---|---|---|
| 3,871,050 | * 3/1975 | Baut et al. ....................... | 15/250.32 |
| 4,348,782 | * 9/1982 | Fournier .......................... | 15/250.32 |
| 4,970,751 | * 11/1990 | Fisher et al. ..................... | 15/250.32 |
| 5,435,041 | * 7/1995 | Ho ................................. | 15/250.32 |
| 5,611,103 | * 3/1997 | Lee ................................ | 15/250.32 |

FOREIGN PATENT DOCUMENTS

| | | | |
|---|---|---|---|
| 3331310 | * 3/1985 | (DE) ................................. | 15/250.32 |
| 141186 | * 5/1985 | (EP) ................................. | 15/250.32 |
| 2562013 | * 4/1985 | (FR) ................................. | 15/250.32 |

* cited by examiner

*Primary Examiner*—Gary K. Graham
(74) *Attorney, Agent, or Firm*—Michael J. Striker

(57) ABSTRACT

The windshield wiper includes a wiper blade (20), a holding clip (22) for holding the wiper blade (20) and an intermediate piece (28) for pivotally connecting the holding clip (22) together with the wiper blade (22) with different-sized wiper arms (12). The intermediate piece (28) is provided with a receiving area (42) for each different wiper arm. The receiving area (42) has different-sized receiving portions for the different wiper arms. The intermediate piece (28) includes two housing halves (32,34) connected in one piece with each other by an elastic member (36). This elastic member (36) consists of a tubular spring (38) extending around the intermediate piece and connecting the two housing halves, so that the two housing halves may be squeezed together or move apart.

3 Claims, 3 Drawing Sheets

WINDSHIELD WIPER

BACKGROUND OF THE INVENTION

1. Field of the Invention

The invention is directed to a windshield wiper with a wiper arm, and, more particularly, to a windshield wiper comprising a wiper arm, which is supported in a drivable manner and which carries a wiper blade at its free end, a holding clip for connecting the wiper blade with the wiper arm in a detachable and articulated manner as well as an intermediate piece for adapting different wiper arms and holding clips for connection with the wiper arm.

2. Prior Art

Windshield wipers of the type mentioned above are known. These windshield wipers are commonly used to wipe windshields of motor vehicles so as to ensure good visibility for the driver of the vehicle. For this purpose, the windshield wipers have a wiper arm which is displaceable via a wiper drive in a swinging or pendular motion. The wiper arm is connected by one end with a wiper shaft which is fixed with respect to the body of the vehicle, while the other free end of the wiper arm carries a wiper blade. A holding clip which is arranged at the free end of the wiper arm in a detachable and articulated manner is provided for connecting the wiper blade with the wiper arm. The detachable arrangement makes it possible to exchange worn wiper blades, while the articulated arrangement permits the wiping movement to be adapted to curved windshields. It is known to connect the wiper arm with the holding clip by an intermediate piece which permits the wiper arm to be adapted to the holding clip. A disadvantage in this respect consists in that this intermediate piece is tailored to a wiper arm or to a holding clip, necessitating a corresponding quantity of different intermediate pieces which are usually delivered along with the wiper blades and from which the appropriate intermediate piece is to be chosen.

SUMMARY OF THE INVENTION

It is an object of the present invention to provide a windshield wiper with a wiper arm which does not have the above-described disadvantage and is adapted to receive and hold a number of different sized wiper blades.

According to the invention a windshield wiper comprising a wiper blade, a holding clip engaging and holding the wiper blade and an intermediate piece for connecting the holding clip together with the wiper blade in a detachable and articulated manner with any one of a number of different wiper arms of different dimensions, wherein the intermediate piece is provided with a receiving area for insertion of each different-sized wiper arm. The receiving area is provided with a plurality of respectively different-sized receiving portions for the different-sized wiper arms which are inserted through a pocket opening provided in one end of the intermediate piece. The respectively different-sized receiving portions have correspondingly different transverse cross-sections decreasing in a stepped manner in an insertion direction for the wiper arms. The intermediate piece advantageously comprises two housing halves connected in one piece with each other by an elastic member, which is a tubular spring extending around the intermediate piece between the two housing halves and connecting the two housing halves, so that the two housing halves may be squeezed together for connection of the intermediate piece with the holding clip and the wiper blade and so that the two housing halves can move apart when one of the different wiper arms is inserted in the intermediate piece.

The windshield wiper according to the invention has the advantage over the prior art that it is possible to adapt the detachable, articulated connection between the wiper arm and holding clip by means of an individual intermediate piece. Due to the fact that the intermediate piece forms a receiving area which is adapted for receiving wiper arms of various dimensions in a positive and frictional engagement, it is possible to insert the wiper arm into the receiving area of the intermediate piece in a simple manner, wherein, in accordance with the dimensioning of the wiper arm, an automatic positive and frictional engagement is carried out in a portion of the receiving area which corresponds to this dimensioning of the wiper arm. Therefore, for example, it is possible when delivering the wiper blade to supply only one intermediate piece which can be fastened to different wiper arms without additional tools and without extra assembly.

Advantageous developments of the invention follow from the rest of the features mentioned in the subclaims.

BRIEF DESCRIPTION OF THE DRAWING

The invention is explained more fully hereinafter in embodiment examples with reference to the accompanying drawings, in which.

DESCRIPTION OF THE PREFERRED EMBODIMENT

Figure 1:
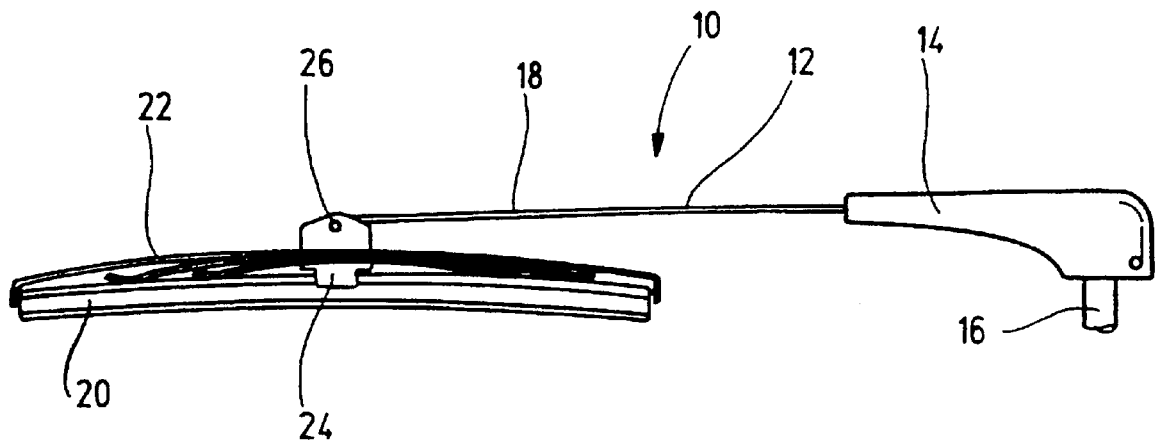
FIG. 1 shows a schematic overall view of a windshield wiper.

FIG. 1 shows a windshield wiper 10. The windshield wiper 10 has a wiper arm 12, one end 14 of which is arranged on the wiper shaft 16 so as to be fixed with respect to rotation relative to it. The other, free end 18 of the wiper arm 12 carries a wiper blade 20. The wiper blade 20 is held by a holding clip 22 which can be connected, via a fastening part 24, with the end 18 of the wiper arm 12 in a detachable and articulated manner. The articulated connection is carried out about an axis of rotation 26 which extends roughly perpendicular to the wiper shaft 16.

Figure 2:
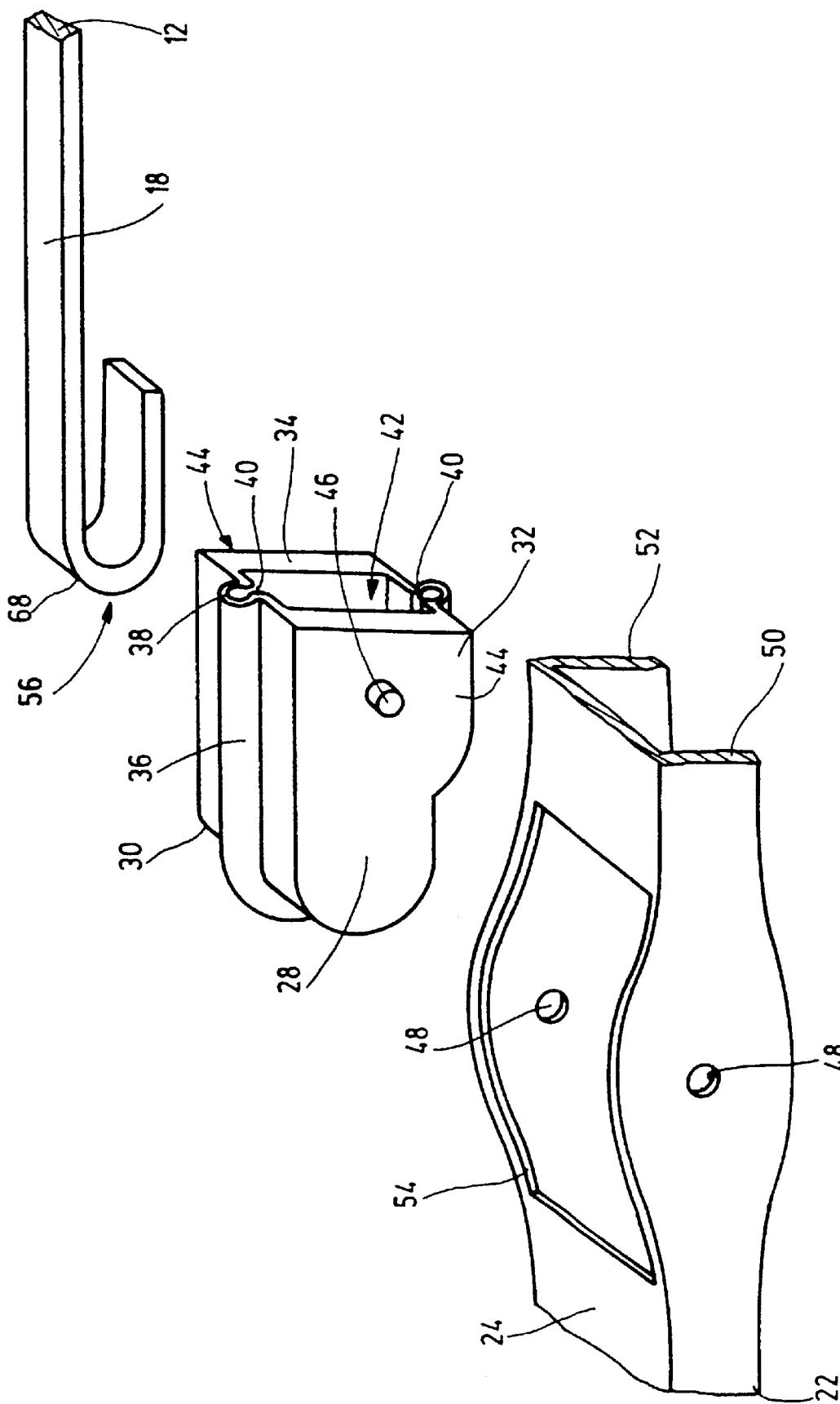
FIG. 2 shows an exploded view of a connection point between a wiper arm and a holding clip.

FIG. 2 shows an exploded view of the connection area between the fastening part 24 of the holding clip 22 and the end 18 of the wiper arm 12. The fastening is carried out by means of an intermediate piece 28. The intermediate piece 28 is formed by a housing 30 having two housing halves 32 and 34 which are connected with one another. The housing halves 32 and 34 are connected by a flexible member 36. The flexible member 36 is formed by a tube-like spring 38 engaging around the housing 30, wherein the longitudinal edges of the spring 38 which are open along a slit 40 are connected integral with the housing halves 32 and 34, respectively. The housing 30 is open on one side so as to form a receiving area 42 whose construction will be described in more detail with reference to the following Figures. The housing 30 has, on its outer surfaces 44, a pin 46 which can be introduced into corresponding openings 48 of the holding clip 22.

The holding clip 22 has a U-shaped profile as seen in cross section, the legs 50 and 52 of this U-shaped profile have the aligned openings 48. A recess 54 whose longitudinal extension is greater than a longitudinal extension of the intermediate piece 28 is provided in the area of the openings 48. In order to assemble the intermediate piece 28, the housing halves 32 and 34 are moved toward one another against the force of the spring 38, so that the pins 46 at the outer surfaces 44 approximate one another with respect to their axial extension. This makes it possible to introduce the intermediate piece 28 into the recess 54 of the holding clip 22. After adjusting the pins 46 with the openings 48, the housing halves 32 and 34 are forced apart by the force of the spring 38, so that the pins 46 lock in the openings 48. The pins 46 and the openings 48 are circular, wherein their respective outer diameter and inner diameter are adapted to one another, so that the intermediate piece 28 is supported essentially without play. The pins 46 engaging in the openings 48 form the axis of rotation 26 (FIG. 1) about which an articulated support of the wiper blade 20 at the wiper arm 12 is effected.

In order to produce a positive and frictional engagement between the holding clip 22 and the wiper arm 12, this wiper arm 12 is pushed into the receiving area of the intermediate piece 28 up to a stop—described hereinafter—by its end 18 which forms a hook 56.

Figure 3:
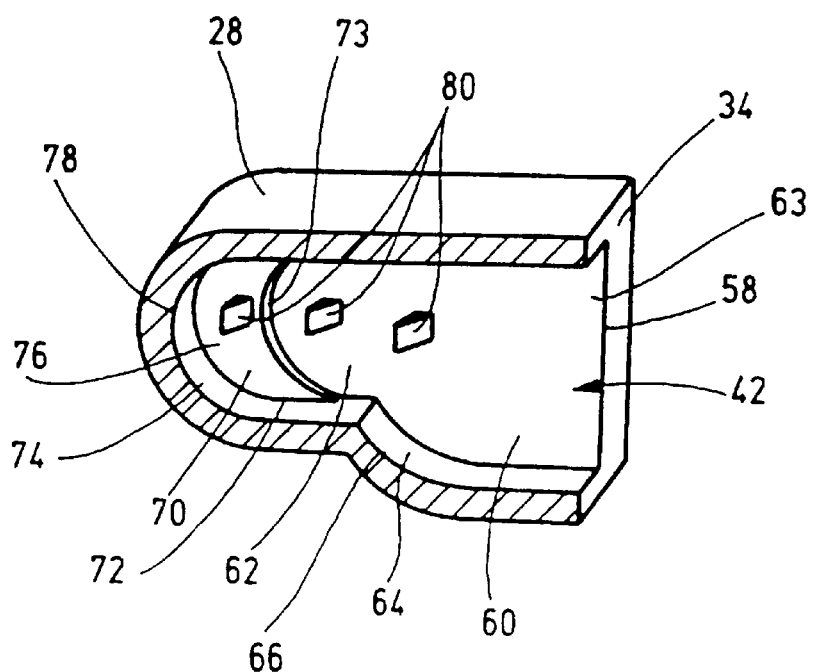
FIG. 3 shows a sectional view of an intermediate piece.

FIG. 3 shows a perspective view of an intermediate piece 28 in section along the slit 40, so that the receiving area 42 is clearly visible. The receiving area 42 is substantially formed by a pocket hole 58 whose free cross-sectional surface is reduced in a stepped manner. A first portion 60 of the receiving area 42 is defined by the inner walls 63 of the housing halves 32 and 34 and by a step 64. The step 64 has an outer surface 66 extending at a radius adapted to a radius of an outer surface 68 of the hook 56 of the wiper arm 12.

A second portion 62 of the receiving area 42 is likewise defined by the inner walls 63 of the housing halves 32 and 34 and, in the axial direction, by a compensation part 70. The compensation part 70 is formed by a thickened portion 72 of the wall of the housing halves 34 and 32. An end face 73 of the compensation part 70 extends at a radius which corresponds to a radius of a surface 68 of the hook 56 of the wiper arm 12.

Finally, the compensation part 70 forms a third portion 74 at which the surfaces 76 extending parallel to the inner wall 63 form a narrowing of the receiving area 42. The portion 74 is defined axially by an inner surface 78 of the housing parts 32 and 34 which again extends at a radius corresponding to a radius of the surface 68 of the hook 56 of the wiper arm 12.

Catch projections 80 projecting transversely into the pocket opening 58 are associated with portions 60, 62 and 74. The catch projections 80 are formed at the inner wall 63 and at the surface 76 of the housing halves 32 and 34.

Figure 4:
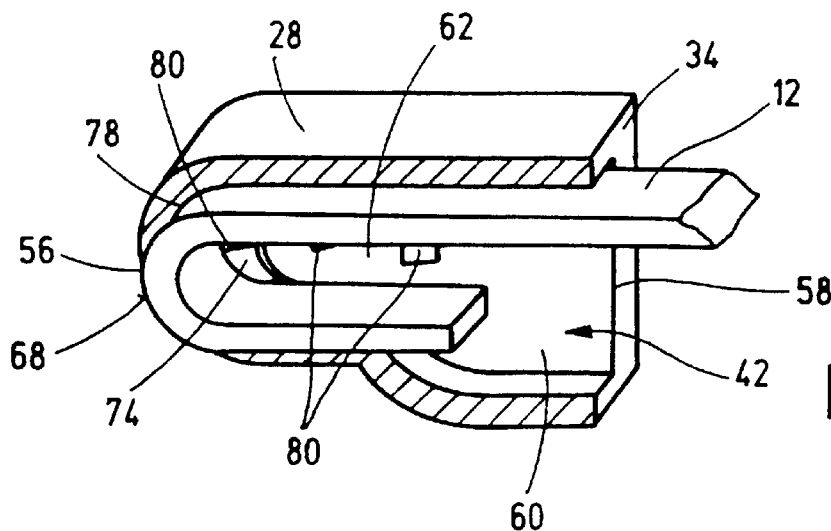
FIGS. 4 to 6 show perspective views of an intermediate piece mounted on different wiper arms.
Figure 5:
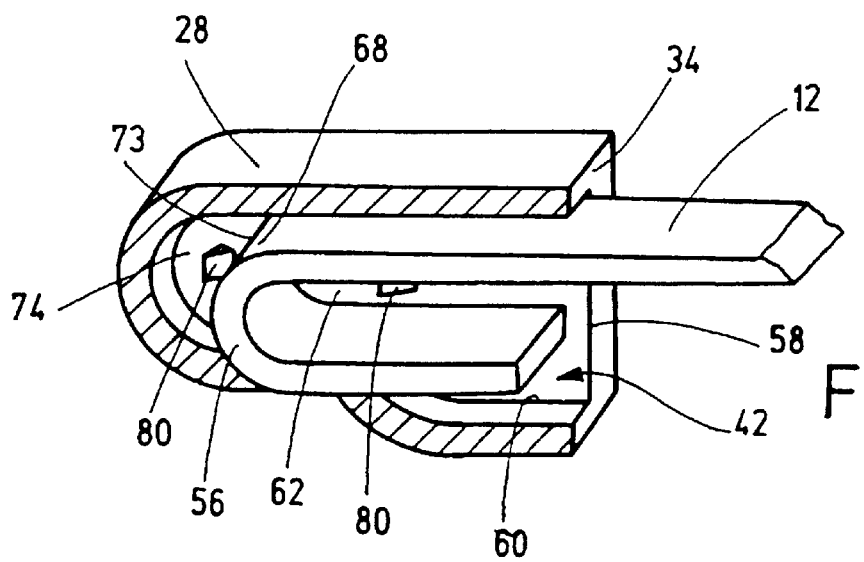
Figure 6:
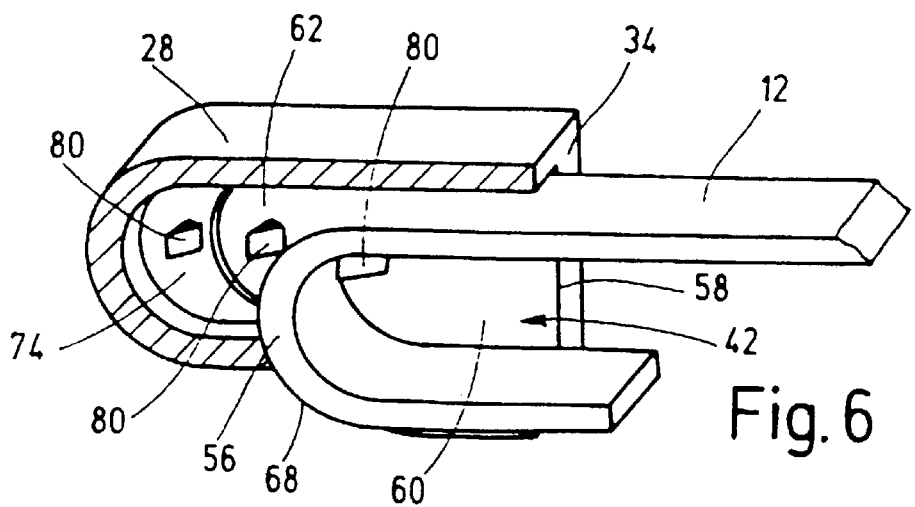

The positive and frictional engagement between the intermediate piece 28 and the wiper arm 12 is shown in different embodiment examples in FIGS. 4 to 6. Parts identical to those in the preceding Figures are provided with identical reference numbers and are not described again. The housing 30 is shown in section for a better view.

According to FIG. 4, the hook 56 of the wiper arm 12 is pushed in up to portion 74 of the receiving area 42. In accordance with the dimensioning of portion 74, wiper arms 12 with a small width and a small radius of the hook 56 can be inserted. A positive engagement is effected between the surface 68 of the hook 56 and the outer surface 78 of the portion 74, while the catch projection 80 associated with portion 74 engages behind by means of the hook 56 to form a frictional engagement.

FIG. 5 shows a positive engagement and frictional engagement between the intermediate piece 28 and the wiper arm 12 in which the hook 56 has the same radius as that in FIG. 4, but the wiper arm 12 has a greater width. Therefore, the wiper arm 12 is pushed in up to portion 62 of the receiving area 42. The positive engagement is carried out between the surface 68 and the stop face 73 of the compensation part 70, while the frictional engagement 73 is carried out in that the catch projection 80 associated with area 62 engages behind by means of the hook 56.

Finally, FIG. 6 shows another embodiment example in which the hook 56 of the wiper arm 12 has a large radius in relation to the embodiment examples in FIGS. 4 and 5 and, according to the embodiment example in FIG. 4, a large width of the wiper arm 12. The wiper arm 12 is pushed into portion 60 of the receiving area 42, wherein a positive engagement is produced between the surface 68 of the hook 56 and the step 64 between portions 60 and 62 of the receiving area 42. The frictional engagement is effected in that the catch projection 80 associated with portion 60 engages behind by means of the hook 56.

With reference to the three possibilities shown in FIGS. 4 to 6, it is clear that a positive and frictional engagement with different constructions, especially different dimensions, of wiper arms 12 is possible by means of a simple construction of the intermediate piece 28, especially its receiving area 42. At the same time, the wiper arm 12 introduced in the receiving area 42 prevents the housing halves 32 and 34 from being pressed together against the force of the spring 38, so that the rotatable support of the intermediate piece 28 at the holding clip 22 via the pins 46 cannot be canceled when the wiper arm 12 is inserted.

What is claimed is:

1. A windshield wiper comprising
   a wiper blade (20);
   a holding clip (22) engaging and holding the wiper blade (20); and
   an intermediate piece (28) for connecting the holding clip (22) and the wiper blade (22) engaged therewith in a detachable and articulated manner with any one of a plurality of different wiper arms (12) of different dimensions, wherein the intermediate piece (28) is provided with a receiving area (42) for insertion of each of the different wiper arms of the different dimensions, said receiving area (42) being provided a plurality of respectively different-sized receiving portions for receiving the different wiper arms of the different dimensions, said wiper arms each being insertable through a pocket opening (58) provided in one end of the intermediate piece (28), said respectively different-sized receiving portions having correspondingly different transverse cross-sections, said transverse cross-sections decreasing in a stepped manner in an insertion direction for said wiper arms;
   wherein said intermediate piece (28) comprises two housing halves (32,34) connected in one piece with each other by an elastic member (36), said elastic member (36) consisting of a tubular spring (38) extending around the intermediate piece between the two housing halves (32,34) and connecting the two housing halves, so that said two housing halves move together for connection of said intermediate piece (28) with said holding clip (22) when the housing halves are squeezed together and so that said two housing halves move apart when said one of said different wiper arms is inserted in said intermediate piece (28).

2. The windshield wiper as defined in claim 1, wherein said plurality of said respectively different-sized receiving portions consist of three receiving portions (60,62,74), said three receiving portions (60,62,74) having respective curved contact surfaces (68) for engagement with corresponding wiper arm end portions (18) and said three receiving portions are provided with respective catch projections (80) for engagement in said corresponding wiper arm end portions (18).

3. The windshield wiper as defined in claim 1, wherein the tubular spring (38) has a longitudinal slit (40) extending around the intermediate piece (28) so that the tubular spring (38) is open to the receiving area (42) provided in the intermediate piece (28).

* * * * *